Patented May 18, 1943

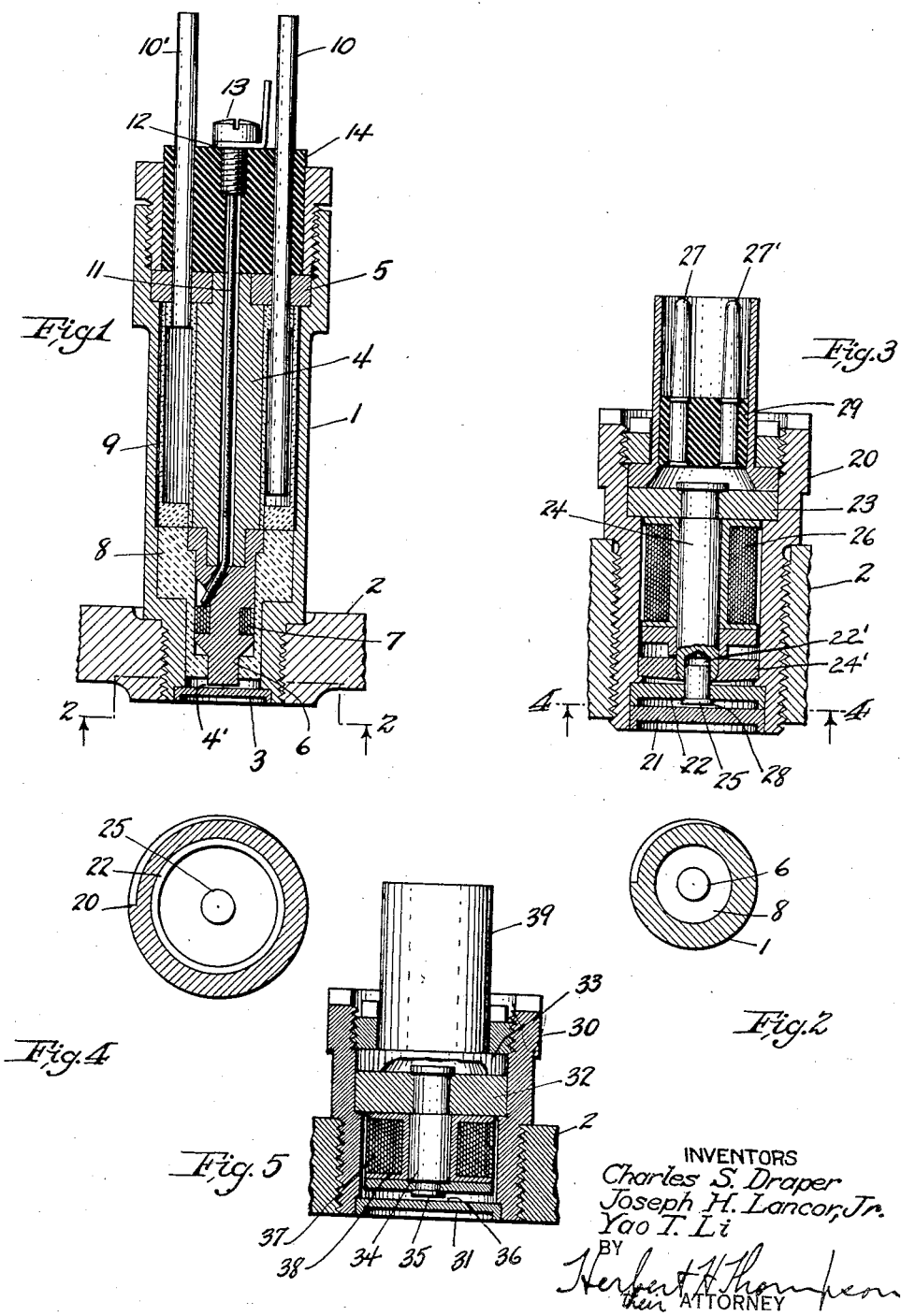

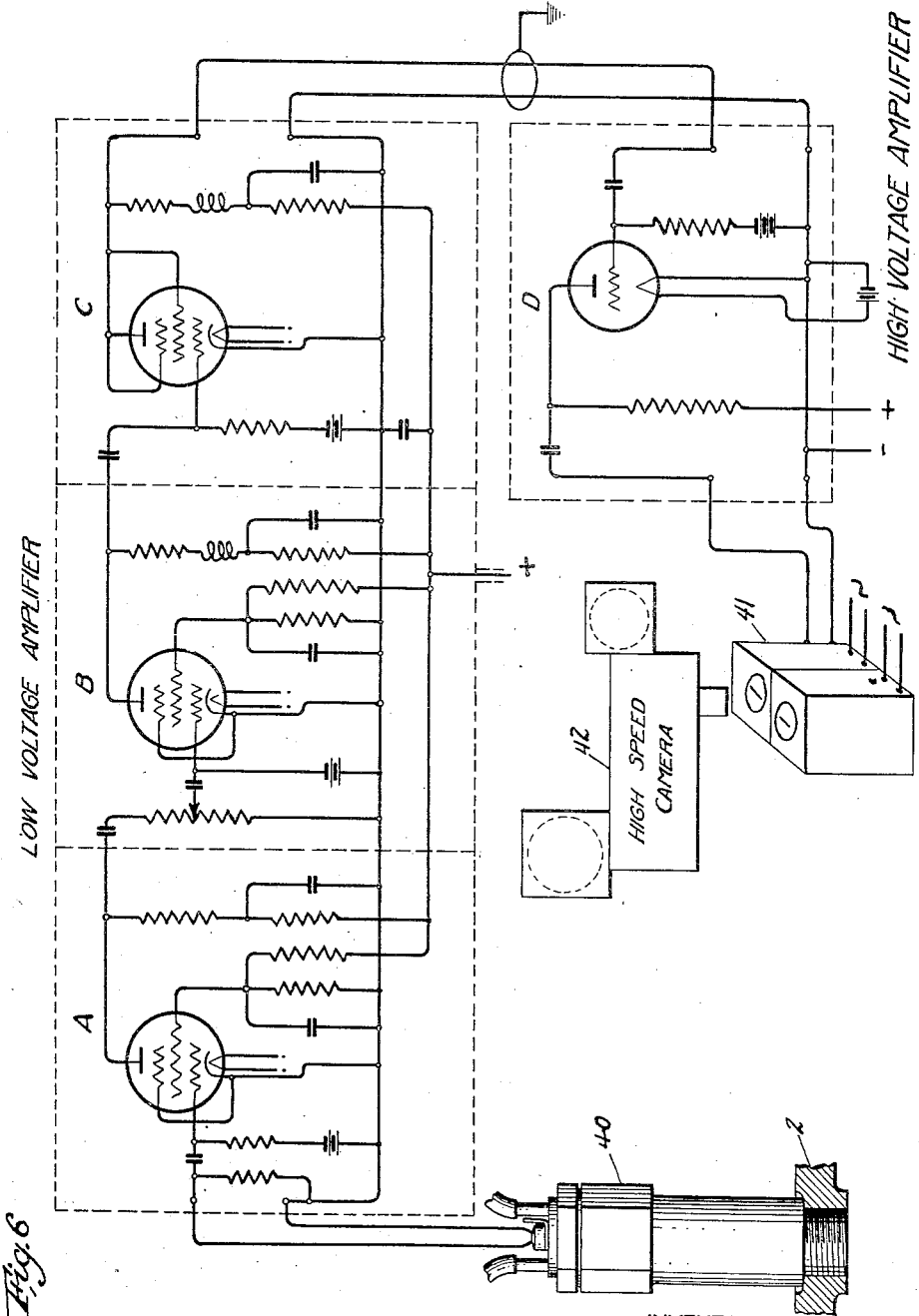

2,319,219

UNITED STATES PATENT OFFICE 2,319,219

PRESSURE INDICATING APPARATUS

Charles S. Draper, Boston, Mass., and Joseph H. Lancor, Jr., Brooklyn, and Yao Tzu Li, New York, N. Y., assignors to Research Corporation, New York N. Y., a corporation of New York Application March 29, 1940, Serial No. 326,626

9 Claims. (Cl. 177—311)

This invention relates to apparatus for indicating the rate of change of pressure within a closed chamber, for example, an internal combustion engine cylinder, and it refers more particularly to apparatus of the above character adapted to provide an accurate measure of the rate of change of pressure within an engine cylinder over a wide range of operating conditions including the condition of detonation.

Detonation or "knock," which is particularly apt to occur in high compression engines such as aircraft engines, is a destructive phenomenon characterized by a steep front, oscillating pressure wave having component frequencies ranging up to 25,000 cycles per second or higher. Only devices capable of following these extremely rapid changes can give a true indication of the pressure or pressure changes which exist in the cylinders of a detonating engine and thereby furnish a measure of the potential danger to the engine from this abnormal operating condition.

Previous cylinder pressure indicating devices have employed structural arrangements which have an inherent natural frequency of vibration too low to permit their giving an accurate indication of detonation and have been found to be unstable in operation. Experience in operating instruments of this type has also shown that it is difficult at the high frequencies involved to obtain an indication of pressure directly and the present invention therefore provides means for measuring not pressure but rate of change of pressure and discloses a structure which is simple, rugged, and reliable in operation and gives an accurate response at high frequencies. Moreover, it has been found that a rate of change of pressure indication has certain advantages over a pressure indication in studying engine performance, particularly detonation, since it accentuates changes which ordinarily are of more interest than steady conditions.

A further disadvantage of earlier engine pressure indicating devices is overcome in certain forms of the present invention by providing means for neutralizing the effect of vibration transmitted to the instrument from the engine cylinder, which may be an important source of error.

One object of the present invention is to provide a device for indicating and furnishing an accurate measure of change of pressure in a closed chamber such as an engine cylinder.

Another object is to provide a device of the above character which is adapted to follow the rapid changes occurring during detonation.

A further object is to provide apparatus furnishing an electrical indication proportional to rate of change of pressure which is of rugged construction and which is operative over a wide frequency range.

A further object is to provide a pressure responsive device which is insensitive to vibration of its mounting.

A further object is to provide a device of the above character in which free vibrations of elastic elements are small and vibrations at operating frequencies are of uniform phase.

Still another object is to provide in such a device elastic means, capable of vibration, for neutralizing the effect of cylinder vibration.

Other objects and advantages of this invention will become apparent as the description proceeds.

Referring to the drawings,

Fig. 1 is a sectional view of a pick-up unit for indicating apparatus according to one form of the invention, assembled on the wall of an engine cylinder or other closed chamber.

Fig. 2 is a partial section along the line 2—2 of Fig. 1.

Fig. 3 is a sectional view of a modified form of pick-up unit which has vibration compensating means and is shown on a larger scale than Fig. 1.

Fig. 4 is a partial section along the line 4—4 of Fig. 3.

Fig. 5 is a view, partly in section, of another modification of our vibration compensated type of pick-up unit.

Fig. 6 is a schematic diagram illustrating the wiring and arrangement of a complete electrical indicating system according to the invention including amplifying, viewing and recording means.

In a pending application, Serial No. 704,868, filed January 2, 1934, of Charles S. Draper, one of the present joint inventors, Patent No. 2,202,900 dated June 4, 1940, assigned to the assignee of the present inventors, there is disclosed a rate of pressure indicating instrument in which a movable coil supported on a pressure actuated diaphragm is vibrated in a magnetic field to generate an E. M. F. proportional to rate of change of pressure. The present invention also makes use of a pressure actuated diaphragm but eliminates the moving coil and causes the displacement of the diaphragm under the influence of pressure changes to vary the reluctance of a magnetic circuit linked with a coil to generate an E. M. F. therein.

Referring particularly to Fig. 1, reference numeral 1 is applied to a hollow casing of steel or other magnetically permeable material preferably adapted for threaded engagement at one end with a chamber wall 2 which may be the wall of the head of an engine cylinder, the threaded end of the casing preferably being flush with the inner surface of the cylinder wall or only slightly displaced inwardly or outwardly therefrom. A circular diaphragm 3 of permeable material, preferably steel, having a reinforced rim, is pressed into a recess at the threaded end of the casing and is supported at its periphery by the casing, the central portion of the diaphragm being free to flex as the pressure of the cylinder gases on it varies. The position of said diaphragm causes it to be directly exposed to the pressure of the cylinder gases without intermediate pressure transmitting means and the cavity formed by the rim reinforcement, which reinforcement may face toward the interior of the cylinder to facilitate assembly, is of such slight depth as to have no effect on the gas pressure exerted on the diaphragm. Therefore, for all practical purposes the diaphragm may be considered to be located flush with or form a continuation of the cylinder wall. Supported centrally within casing 1 is a cylindrical permanent magnet 4, preferably of cobalt steel, axially magnetized and in contact at its upper end with an annular spacer 5 of permeable material magnetically connecting the magnet 4 and casing 1. The term "permeable" as used in this specification and in the claims refers to material having a relatively high magnetic permeability such as iron and the ferrous alloys while the term "non-permeable" refers to material having a relatively low magnetic permeability such as most of the non-ferrous metals.

Magnet 4 bears at its lower end permeable pole piece 6 which serves as a core for coil 7. Pole piece 6 is rigidly spaced from the casing by means of annular member 8 of non-permeable material and magnet 4 may be surrounded by a hollow annular jacket 9 likewise of non-permeable material having inlet and outlet pipes 10 and 10', respectively, by means of which a flow of water or other cooling liquid may be maintained through the jacket, although in many applications liquid cooling has been found to be unnecessary.

Connection to one end of coil 7 is by means of insulated lead 11 connected to lug 12 which is positioned and clamped by screw 13 threaded into insulated bushing 14. The opposite end of coil 7 may be grounded to the casing (by a connection not shown) or may be brought out to a separate terminal to avoid the effects of erratic circulating currents in the metallic "ground." Diaphragm 3 is spaced from the lower end of pole piece 6 by a small air gap 4'. Since the diaphragm is directly exposed to the pressure within the cylinder it will be deflected by changes of cylinder pressure and thereby vary the length of gap 4' which is the only gap in a magnetic circuit otherwise completed through permeable material, including diaphragm 3, casing 1, spacer 5, magnet 4 and pole piece 6.

Since gap 4' forms the greater part of the reluctance of the magnetic circuit just traced, it will be apparent that the flux set up in this circuit by the constant magnetomotive force of magnet 4 will vary substantially directly with gap length and hence with the displacement of the central portion of diaphragm 3. The diaphragm itself is relatively thick and stiff, having a thickness of .060 inch and a diameter of .500 inch in a preferred design, resulting in a measured natural frequency of vibration of 95,000 cycles per second. It will be apparent from the construction disclosed that diaphragm 3 alone resists the entire cylinder pressure exerted upon it without the aid of cooperating stiffening members and that the displaceable portion of said diaphragm constitutes the complete moving system of the instrument. Therefore, the effective mass and elasticity of the moving system, which determine its natural frequency of vibration (neglecting the effect of fluid loading and damping), reside wholly in said diaphragm.

In operation, a change of cylinder pressure, for example, an increased pressure, causes the central part of diaphragm 3 to be deflected and move toward pole piece 6 a distance proportional to the increase in pressure thereby increasing the flux in the magnetic circuit traced above with which coil 7 is linked by virtue of its encirclement of pole piece 6. An E. M. F. is therefore generated in said coil proportional to the rate of change of flux and hence proportional to the rate of change of diaphragm displacement and to rate of change of cylinder pressure.

Referring now to the arrangement of Fig. 3, there is shown a form of our invention which operates in a manner similar to that of the arrangement of Fig. 1 as above described and in addition has means which render it insensitive to cylinder vibration. In Fig. 3 there is shown a structure comprising a cylindrical hollow casing 20 of permeable material preferably adapted for threaded engagement at one end with a cylinder wall and which has a pair of rim-stiffened diaphragms 21 and 22, diaphragm 21 being of permeable material, preferably steel, while diaphragm 22 is of non-permeable material such as beryllium bronze. Both diaphragms are pressed into a circular recess in the lower or threaded end of casing 20, and are spaced by the raised rim of diaphragm 22. A permanent magnet, preferably of cobalt steel in the form of a circular disc 23, radially magnetized, furnishes the magnetomotive force in the magnetic circuit which includes in addition, casing 20, diaphragm 21 and cylindrical core 24 of permeable material, preferably soft iron, slidably engaged at its lower end by a button 25 also of permeable material rigidly mounted on diaphragm 22 but free to move in recess 22'. An air gap 28 exists between button 25 and diaphragm 21 which constitutes the major part of the reluctance of the magnetic circuit otherwise closed through permeable material. Core 24 is laterally supported at its lower end by annular member 24'.

A coil 26 surrounds core 24 and for purposes of illustration, the connections to this coil are shown as made by way of contact prongs 27 and 27' supported in insulating bushing 29 to which the end leads of the coil are electrically connected. A connector plug (not shown), having contacts adapted to mate with prongs 27, 27' and which may be guided by a cylindrical shell surrounding said prongs, may be used to provide for attachment and detachment of an electrical cable.

Diaphragms 21 and 22 which are relatively thick and stiff are generally similar to diaphragm 3 of Fig. 1 and both diaphragms are accurately formed to have the same natural frequency of vibration which may be of the order of that of diaphragm 3.

It will be evident that in the arrangement of Fig. 1 any vibration of cylinder wall 2 will be transmitted directly to pole piece 6 owing to the rigid nature of the structure formed by said pole piece, spacing member 8 and casing 1 and any component vibration directed along the axis of the instrument will result in relative motion between the end of pole piece 6 and diaphragm 3, the inertia of the central portion of the diaphragm causing said central portion to retain its position in space or to act as the "seismic mass" of vibration measuring instruments. This relative motion varies the flux in the magnetic circuit and generates an E. M. F. in coil 7 proportional to the velocity of the axial vibration component thereby giving a false indication of pressure changes.

The arrangement of Fig. 3 overcomes the generation of the undesired vibration E. M. F. by providing in non-permeable diaphragm 22 carrying permeable button 25, a member adapted to neutralize the effect of vibration of diaphragm 21. It will be apparent that cylinder wall vibration is transmitted to both diaphragms 21 and 22. The common natural frequency of these diaphragms is made much higher than the frequencies transmitted from the cylinder wall so that the diaphragms are never excited at resonance and since they vibrate below resonance the phases of their respective motions remain substantially the same. The diaphragms (including button 25) therefore vibrate substantially in unison and since gap 28 is unchanged no E. M. F. is generated in response to cylinder vibration, the device being sensitive only to changes of pressure.

The arrangement of Fig. 5 differs from that shown in Fig. 3 in that compensating diaphragm 22 is omitted and the elastic properties of the disc magnet together with the effective mass of the magnet and coil structure which form with the magnet an oscillatory system are utilized to compensate for cylinder wall vibration. The device as in other forms comprises a cylindrical steel casing 30 threaded at one end into cylinder head wall 2 with a diaphragm 31 pressed into and supported in a recess at the threaded end for direct exposure to the cylinder gases. Circular disc magnet 32 clamped at its periphery between a shoulder on casing 30 and spacer 33 is radially magnetized and mounts magnet core 34 of permeable material, preferably soft iron, terminating in button 35 at its lower end. Button 35 is spaced from diaphragm 31 by an air gap 36. Coil 37, supported by coil form 38, is mounted on core 34.

Disc magnet 32 being clamped only at its periphery is free to deflect at the center and the ratio of the elasticity of the disc to the mass mounted on it and vibrating with it, which includes the core piece 34, coil 37 and associated parts, is adjusted so that this entire assembly has a natural period of vibration equal to that of diaphragm 31. This vibrating structure comprising magnet 32 and the parts it mounts, therefore, has the same effect as compensating diaphragm 22 of Fig. 3 in that as cylinder wall 2 vibrates, both diaphragm 31 and button 35 on core 34 vibrate together with the result that the length of gap 36 is maintained constant, thereby preventing the generation of an E. M. F. in response to cylinder wall vibration. Diaphragm 31 deflects under the influence of cylinder pressure as in the other arrangements described generating an E. M. F. in coil 37 proportional to pressure changes but independent of vibration. By thus making use of the elastic properties of the disc magnet, a compensated indicator is obtained by simple structural means with few parts. A cylindrical shell 39 may be provided to guide a cable attachment plug as described in connection with Fig. 3.

The schematic diagram of Fig. 6 shows a pick-up unit which may have the structure of any of our previously described arrangements, connected to viewing means illustrated as a cathode ray oscillograph, with provision for making permanent records by means of a high speed camera.

Since the small flexural displacements of the diaphragm of the pressure sensitive pick-up generate only small E. M. F.'s, the output of the pick-up must be considerably amplified before it is capable of actuating exhibiting or recording means. Pick-up 40 is therefore connected to a two-part amplifier, the first part, comprising stages A, B and C, being a low-voltage high-gain amplifier for stepping-up the low voltage output of the pick-up, while the second part, comprising stage D, is an amplifier designed to handle the high voltages applied to the deflecting plates of the cathode ray oscillograph. Stages A and B of the low voltage amplifier make use of pentodes, resistance-coupled by conventional circuits, with inter-stage gain control, while stage C uses a pentode preferably connected as a triode to provide for greater grid voltage swings. The high voltage amplifier comprising stage D, is designed to operate at the relatively high voltages required to actuate the oscillograph and makes use of a triode whose output is resistance coupled to the oscillograph plates. Cathode ray oscillograph 41 is supplied with power from a suitable alternating current source and may include more than one cathode ray tube, as shown, so that if desired, pick-ups may be mounted on more than one cylinder of a multi-cylinder engine or cylinders of different engines and a multiple indication obtained at the observing or recording station. A cathode ray oscillograph is preferably used because of the wide frequency range involved. A permanent record of the traces on the faces of the tubes of oscillograph 41 may be obtained by the use of a high speed camera 42 which is preferably adapted to take pictures at a high enough rate of speed to record the variations of pressure occurring during detonation. A film speed of 400 ft. per sec. has been used for this purpose to resolve the fine structure of the rate of change of pressure curve during periods of detonation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In apparatus of the character described, a hollow casing, an outer diaphragm of permeable material closing one end of said casing, an inner diaphragm spaced therefrom, a pole piece of magnetic material mounted on said inner diaphragm and spaced from said outer diaphragm by an air gap, means for producing magnetic flux in said gap variable in accordance with the length thereof and a coil linked with a substantial portion of said flux for generating an E. M. F. in accordance with variations of said flux, said outer and inner diaphragms being adapted to execute vibrations at the same rate when jointly excited by vibration transmitted to said casing.

2. Apparatus for measuring rate of change of pressure within a cylinder of an internal combustion engine cylinder comprising, a hollow casing adapted to project inwardly through the cylinder wall and closed at its inner end by a relatively thick elastic diaphragm of magnetically permeable material disposed substantially flush with the inner surface of the cylinder wall, said diaphragm being sufficiently rigid to alone withstand the cylinder pressure, a second elastic diaphragm of non-permeable material supported at its periphery by said casing and spaced from said first diaphragm, a button of permeable material mounted on said second diaphragm and spaced from said first diaphragm by a short air gap, said second diaphragm and button, in combination, having a natural frequency of vibration substantially the same as that of said first diaphragm alone, and said common natural frequency being high relative to the range of frequencies occurring in cylinder wall vibration, a magnetic circuit including flux producing means, the magnitude of the flux in said circuit being controlled by the length of said gap, and a coil linked with said magnetic circuit for generating an E. M. F. in response to rate of change of flux therein.

3. In pressure indicating apparatus, a hollow casing having an opening, a diaphragm of magnetically permeable material closing said opening, a disc-shaped radially magnetized permanent magnet supported at its periphery by said casing, the central portion of said magnet being free to deflect transversely, a magnetically permeable pole piece centrally mounted on said magnet and spaced from said diaphragm by a short air gap, and a coil surrounding said pole piece, the magnet, pole piece and coil forming a structural assembly substantially having a natural period of vibration equal to that of the diaphragm thereby compensating for cylinder vibration in the apparatus.

4. In pressure indicating apparatus, a hollow cylindrical casing of magnetically permeable material, a magnetically permeable diaphragm closing one end of said casing, a circular elastic disc supported at its periphery only within said casing, said disc being of material having a high coercive force, a magnetic pole piece centrally mounted on said disc and spaced from said diaphragm by a short air gap and a coil surrounding said pole piece, the disc, pole piece and coil forming a structural assembly substantially having a natural period of vibration equal to that of the diaphragm thereby compensating for cylinder vibration in the apparatus.

5. A magnetic pick-up for measuring the rate of change of pressure within the cylinder of an internal combustion engine comprising in combination, a hollow casing, a relatively thick diaphragm of magnetic material positioned to close one end of the hollow casing and disposed substantially flush with the inner surface of the engine cylinder wall, a member of magnetic material resiliently supported in said casing and spaced from said diaphragm by an air gap, said member and the support therefor having a natural period of vibration substantially the same as that of the relatively thick diaphragm to compensate for cylinder vibration in the pick-up, means for providing a constant magnetomotive force for the pick-up, the flux varying in said member in proportion to the length of said gap, and a coil positioned to link a substantial portion of the varying flux carried by said member.

6. A magnetic pick-up for measuring the rate of change of pressure within the cylinder of an internal combustion engine comprising in combination, a hollow casing, a relatively thick diaphragm of magnetic material positioned to close one end of the hollow casing and disposed substantially flush with the inner surface of the engine cylinder wall, a flux carrying member resiliently supported within said casing and spaced from the diaphragm by an air gap, a coil linked to said flux carrying member providing the measuring output of the pickup, said resiliently supported flux carrying member and the coil linked thereto forming a structural assembly having a natural period of vibration substantially the same as that of the relatively thick diaphragm to thereby compensate for cylinder vibration in the pickup.

7. An engine detonation indicator magnetic pickup comprising in combination, a hollow casing, an inner and outer pair of substantially parallel spaced elastic discs positioned to close one end of the hollow casing, the outer of the discs being of magnetic material and being disposed substantially flush with the inner surface of the engine cylinder wall, a flux carrying fixed member situated within the hollow casing, a second flux carrying member slidably engaging the fixed member and mounted on the inner of the parallel spaced elastic discs which is of non-magnetic material, said inner disc supporting said second flux carrying member in air gap spaced relation to the outer disc, the respective discs having similar natural periods of vibration to compensate for cylinder vibration in the pickup, and a coil linked to the flux carrying fixed member in which the flux varies in proportion to the length of the air gap.

8. A pick-up adapted for attachment to the wall of a cylinder of an internal combustion engine as a closure of an opening therein for obtaining an indication of the rate of change of gas pressure within the cylinder comprising a housing, a first displaceable member supported from said housing for exposure to the gases within the cylinder, displacement of said member by virtue of its mounting being caused to be responsive jointly to change gas pressure and displacement of the housing, a second displaceable member supported from said housing in spaced relationship to said first member and arranged to avoid exposure to the cylinder gases, displacement of said second member being thereby caused to be responsive substantially solely to displacement of said housing and means for measuring relative displacement of said two members including magnetic means for producing flux variable in accordance with the spacing of said members and means for translating variation of said flux into an electrical quantity.

9. A pick-up for indicating change of gas pressure in the cylinder of an internal combustion engine comprising members arranged to form a magnetic circuit including a short air gap, said gap being bounded on one side by a member arranged for displacement in accordance with cylinder wall vibration and in accordance with change of gas pressure within the cylinder to which the pick-up is attached, said gap being bounded on the other side by a member arranged for displacement in accordance with cylinder wall vibration unmodified by change of gas pressure, a source of magneto-motive force for setting up magnetic flux in said circuit the amount of said flux being determined by the length of said gap, and indicating means actuated in accordance with change of said flux.

CHARLES S. DRAPER.
JOSEPH H. LANCOR, Jr.
YAO TZU LI.